US012092052B2

(12) United States Patent
Warey et al.

(10) Patent No.: US 12,092,052 B2
(45) Date of Patent: Sep. 17, 2024

(54) EARLY WARNING SYSTEM FOR STOCHASTIC PREIGNITION

(71) Applicant: GM Global Technology Operations LLC, Detroit, MI (US)

(72) Inventors: Alok Warey, Novi, MI (US); Ronald O. Grover, Jr., Northville, MI (US); Balakrishna Chinta, Troy, MI (US); Elana M. Chapman, Rochester Hills, MI (US); John O. Waldman, Troy, MI (US); Hugh W. Miller, Linden, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 82 days.

(21) Appl. No.: 18/152,309

(22) Filed: Jan. 10, 2023

(65) Prior Publication Data

US 2024/0229733 A1 Jul. 11, 2024

(51) Int. Cl.
*F02D 41/22* (2006.01)
*F02D 35/02* (2006.01)
*F02D 41/30* (2006.01)
*F02D 41/14* (2006.01)

(52) U.S. Cl.
CPC ........... *F02D 41/22* (2013.01); *F02D 35/023* (2013.01); *F02D 41/30* (2013.01); *F02D 2041/1433* (2013.01)

(58) Field of Classification Search
CPC ............................... F01D 41/22; F02D 35/023
See application file for complete search history.

(56) References Cited

U.S. PATENT DOCUMENTS 8,244,426 B2 * 8/2012 Buur .................... B60W 20/00 701/32.7
2013/0047956 A1 * 2/2013 Davis ...................... F02D 37/02 123/406.11
2013/0054109 A1 * 2/2013 Buslepp ................ F02D 41/009 701/102
2014/0025278 A1 * 1/2014 Gwidt .................. F02D 41/402 701/105

OTHER PUBLICATIONS

Brunton et al., Chaos as an intermittently forced linear system, Nature Communications 8, May 30, 2017, pp. 1-9, vol. 19, https://doi.org/10.1038/s41467-017-00030-8.
Brunton et al., Chaos as an Intermittently Forced Linear System, Cornell University Arxiv, Aug. 18, 2016, pp. 1-34, https://doi.org/10.48550/arXiv.1608.05306.

* cited by examiner

*Primary Examiner* — John Kwon
(74) *Attorney, Agent, or Firm* — Vivacqua Crane, PLLC

(57) ABSTRACT

A method for early detection of a stochastic preignition (SPI) in an internal combustion engine includes monitoring sensor data from a sensor that is coupled to the internal combustion engine of a vehicle, determining whether a SPI event will occur using the sensor data and a Hankel Alternative View of Koopman (HAVOK) model, and commanding the vehicle to take a corrective action before the SPI event occurs to prevent the SPI event from happening in response to determining that the SPI event will occur.

12 Claims, 2 Drawing Sheets

EARLY WARNING SYSTEM FOR STOCHASTIC PREIGNITION

INTRODUCTION

The present disclosure relates to early warning systems and methods for stochastic preignition.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Currently, some vehicles use internal combustion engines for propulsion. Internal combustion engines ignite fuel to move a piston inside a cylinder.

SUMMARY

In an aspect of the present disclosure, the present application describes a method for early detection of a SPI event in an internal combustion engine. The method includes monitoring sensor data from a sensor that is coupled to the internal combustion engine of a vehicle, determining whether a SPI event will occur using the sensor data and a Hankel Alternative View of Koopman (HAVOK) model, and commanding the vehicle to take a corrective action before the SPI event occurs to prevent the SPI event from happening in response to determining that the SPI event will occur.

In an aspect of the present disclosure, the sensor data includes a peak cylinder pressure in the internal combustion engine of the vehicle. Determining whether a SPI event will occur using the sensor data and the HAVOK model includes determining, in real time, a forcing term using the sensor data which may be the peak cylinder pressure in the internal combustion engine of the vehicle.

In an aspect of the present disclosure, determining whether the SPI event will occur using the sensor data and the (HAVOK) model includes determining whether the forcing term is greater than a predetermined threshold and, in response to determining whether the forcing term is greater than the predetermined threshold, determining that the SPI event will occur.

In an aspect of the present disclosure, the threshold is an absolute value of the forcing term In an aspect of the present disclosure, the threshold if the rate of change of the forcing term.

In an aspect of the present disclosure, the threshold is the variance of the forcing term In an aspect of the present disclosure, the corrective action is adding fuel to the internal combustion engine, or reducing boost pressure or changing cam phasing.

In an aspect of the present disclosure, the method further includes updating HAVOK model using the monitored sensor data.

In an aspect of the present disclosure, the sensor is a knock sensor, an ion sensor, or a manifold air pressure sensor.

The present disclosure also describes a tangible, non-transitory, machine-readable medium, including machine-readable instructions, that when executed by one or more processors, cause one or more processors to execute the methods described above.

The present disclosure also describes a system including an internal combustion engine, a sensor coupled to the internal combustion engine, and a controller in communication with the sensor. The controller is programmed to execute the methods described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
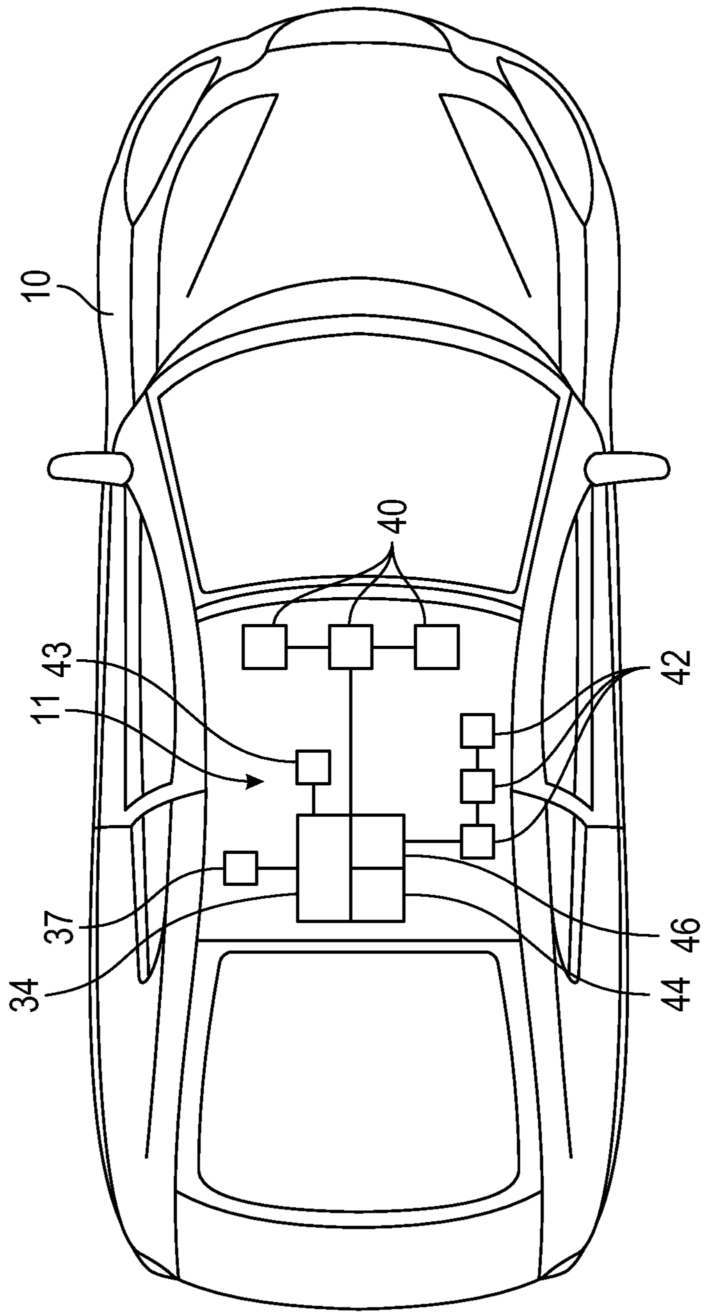
FIG. 1 is a schematic top view of a vehicle including an early warning system for stochastic preignition.

Reference will now be made in detail to several examples of the disclosure that are illustrated in accompanying drawings. Whenever possible, the same or similar reference numerals are used in the drawings and the description to refer to the same or like parts or steps.

Figure 2:
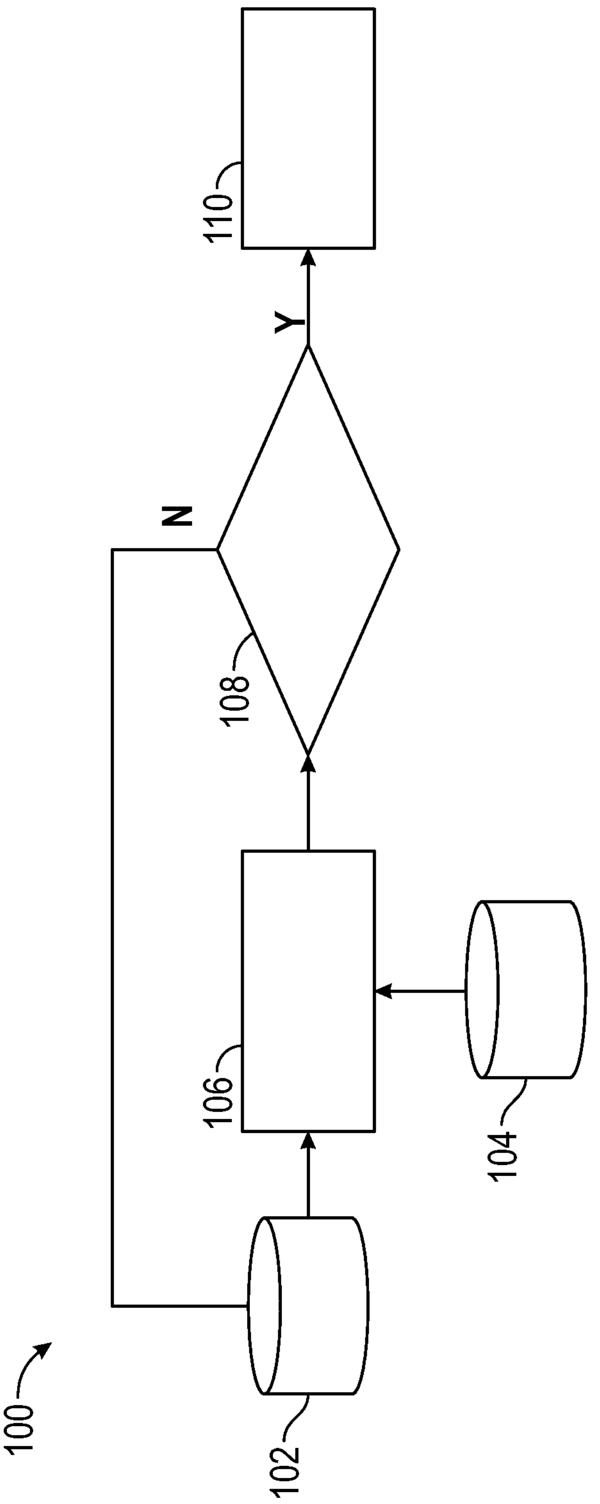
FIG. 2 is a flowchart of a method for providing early warning of stochastic preignition.

With reference to FIGS. 1 and 2, a vehicle 10 includes (or is in communication with) an early warning system 11 for stochastic preignition (SPI). SPI is an abnormal combustion event that can occur during the operation of modern, highly boosted direct-injection gasoline engines. This abnormal combustion event is characterized by an undesired and early start of combustion that is not initiated by the spark plug. Early SPI events can subsequently lead to violent auto-ignitions and have the potential to severely damage engines. It is therefore desirable to develop methods and systems that predict SPI events and take corrective action to prevent the SPI events.

While the system 11 is shown inside the vehicle 10, it is contemplated that the system 11 may be outside of the vehicle 10. As a non-limiting example, the system 11 may be in wireless communication with the vehicle 10. Although the vehicle 10 is shown as a sedan, it is envisioned that that vehicle 10 may be another type of vehicle, such as a pickup truck, a coupe, a sport utility vehicle (SUVs), a recreational vehicle (RVs), etc.

The vehicle 10 includes an internal combustion engine 43, a controller 34, and one or more sensors 40 in communication with the controller 34. The internal combustion engine 43 is used to propel the vehicle 10 and is in communication with the controller 34. Accordingly, the internal combustion engine 43 may receive commands from the controller 34. The sensors 40 collect information and generate sensor data indicative of the collected information. As non-limiting examples, the sensors 40 may include one or more knock sensors, one or more ion sensor, one or more manifold air pressure sensors and/or any other sensor capable of detecting an SPI event (computed or measured). The sensors 40 are configured to generate sensor data and/or signal indicative of an SPI event.

The system 11 further includes a controller 34 in communication with the sensors 40. Accordingly, the controller 34 is programmed to receive sensor data from the sensors 40. The controller 34 includes at least one processor 44 and a non-transitory computer readable storage device or media 46. The processor 44 may be a custom-made processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media of the controller 34 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the cameras, perform logic, calculations, methods and/or algorithms for automatically controlling the components of the vehicle 10, and generate control signals to the actuators 42 to automatically control the components of the vehicle 10 based on the logic, calculations, methods, and/or algorithms. Although a single controller 34 is shown in FIG. 1, the system 11 may include a plurality of controllers 34 that communicate over a suitable communication medium or a combination of communication mediums and that cooperate to process the sensor signals, perform logic, calculations, methods, and/or algorithms, and generate control signals to automatically control features of the system 11. In various embodiments, one or more instructions of the controller 34 are embodied in the system 11. The non-transitory computer readable storage device or media 46 includes machine-readable instructions (shown, for example, in FIG. 2), that when executed by the one or more processors, cause the processors 44 to execute the method 100 (FIG. 2).

The vehicle 10 may include one or more communication transceivers 37 in communication with the controller 34. Each of the communication transceivers 37 is configured to wirelessly communicate information to and from other remote entities, such as the remote vehicles, (through "V2V" communication), infrastructure (through "V2I" communication), remote systems at a remote call center (e.g., ON-STAR by GENERAL MOTORS, and/or personal electronic devices, such as a smart phone. The communication transceivers 37 may be configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication transceivers 37 may include one or more antennas for receiving and/or transmitting signals, such as cooperative sensing messages (CSMs). The communication transceivers 37 may be considered sensors 40 and/or sources of data. The remote vehicles may include one or more communication transceivers 37 as described above with respect to the vehicle 10.

The vehicle 10 includes one or more actuators 42 in communication with the controller 34. The actuators 42 control one or more vehicle features such as, but not limited to, a fuel injection system, one or more cam phasers, spark plugs, and a camshaft. The vehicle features may further include interior and/or exterior vehicle features such as, but are not limited to, doors, a trunk, and cabin features such as air, music, lighting, etc.

With reference to FIGS. 1 and 2, the system 11 is configured to provide real time warnings and detection of SPI events at least one or two cycles before the SPI takes place. Because of the early warnings provided by the system 11, the controller 34 may command the actuators 42 to provide mitigations measures that may prevent or mitigate the SPI event. The system 11 may be easily implemented onboard the vehicle 10 and utilizes relatively low computational resources and memory. The system 11 may also be used to predict engine knock. Further, the system 11 may be used to diagnose issues with the internal combustion engine 43.

To provide the early warnings of an SPI event, a Hankel Alternative View of Koopman (HAVOK) analysis is performed with training data. In this case, the training data may be engine data collected by sensors in a laboratory. This training data may correlate the peak cylinder pressure in the internal combustion engine 43 with SPI events. The HAVOK analysis entails the decomposition of chaos into a linear dynamic system with intermittent forcing. The eigen-time-delay coordinates may be obtained from a time series of a single measurement x(t) by taking a singular value decomposition (SVD) of a Hankel matrix H. The SVD of the Hankel matrix H yields a hierarchy of eigen time series that produce a delay-embedded attractor. A best-fit linear regression model is obtained on the delay coordinates. The connection between the eigen-time-delay coordinates from the Hanel matrix and a Koopman operator motivates a linear regression model. The columns U and V from the SVD are arranged hierarchically by their ability to model the columns and rows of the Hankel matrix H. The HAVOK analysis also generates a U matrix and a Hankel model according to the following equation:

$$\frac{d}{dt}v(t) = Av(t) + Bv_r(t)$$

where;

t is time;

v is a vector of the eigen-time delay coordinates;

$v_r$ is the last variable and acts as a forcing term;

A is a first prediction matrix using the HAVOK analysis; and

B is a second prediction matrix using the HAVOK analysis.

FIG. 2 is an early warning method 100 for stochastic preignition. The method 100 begins at block 102. At block 102, the controller 34 monitors the sensor data or sensor signal received from one or more sensors 40. In particular, the controller 34 may monitor the sensor data or sensor signal received from the knock sensor, the ion sensor, a manifold air pressure sensor and/or any other sensor or signal indicative of a SPI event (computed or measured). This sensor data may be indicative, for example, of the peak cylinder pressure in the internal combustion engine 43 of the vehicle 10.

The method 100 also includes block 104. At block 104, the controller 34 retrieves the U matrix of the HAVOK model from the non-transitory computer readable storage device or media 46. Then, the method 100 continues to block 106. At block 106, the controller 34 applies the HAVOK model to a snapshot of the monitored sensor data received from the sensor 40 to determine whether an SPI event will occur in the near future. The snapshot of the monitored sensor data may be the peak cylinder pressure in the internal combustion engine 43 of the vehicle 10 within a predetermined time interval. At block 106, the snapshot of the monitored sensor data is convolved with the U matrix to determine, in real time, a forcing term using the sensor data and the U matrix of the HAVOK model. The forcing term may be based on the peak cylinder pressure in the internal combustion engine 43 of the vehicle 10. The method 100 then continues to block 108.

At block 108, the controller 34 determines determining whether the forcing term is greater than a predetermined threshold to determine whether a SPI event will occur. As non-limiting examples, the threshold for the forcing term may be an absolute value, the rate of change, or the variance. If the forcing term is equal to or less than the predetermined threshold, then the method 100 returns to block 102. If the forcing term is greater than the predetermined threshold, then the controller 34 determines that a SPI event will occur and the method 100 proceeds to block 110.

At block 110, the controller 34 updates the HAVOK model (specifically the U matrix) as new SPI events are logged from the vehicle 10 and/or other vehicles. Further, at block 110, the controller 34 commands the vehicle 10 to take a corrective action before the SPI event occurs to prevent the SPI event from happening. Specifically, the controller 34 commands the actuators 42 to take a corrective action to prevent the SPI event from happening. As non-limiting examples, the corrective actions may include adding additional fuel to the internal combustion engine 43, changing the movement of the cam phaser of the vehicle 10, clear the fast retard, reducing the boost limit in the internal combustion engine 43, and/or modifying the equivalence ratio in the internal combustion engine 43.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for early detection of a stochastic preignition (SPI) in an internal combustion engine, comprising:

monitoring sensor data from a sensor that is coupled to the internal combustion engine of a vehicle;

determining whether a SPI event will occur using the sensor data and a Hankel Alternative View of Koopman (HAVOK) model;

commanding the vehicle to take a corrective action before the SPI event occurs to prevent the SPI event from happening in response to determining that the SPI event will occur;

wherein the sensor data includes a peak cylinder pressure in the internal combustion engine of the vehicle;

wherein determining whether the SPI event will occur using the sensor data and the HAVOK model includes determining, in real time, a forcing term using the sensor data, wherein the forcing term is based on the peak cylinder pressure in the internal combustion engine of the vehicle;

wherein determining whether the SPI event will occur using the sensor data and the HAVOK model includes: determining whether the forcing term is greater than a predetermined threshold; and in response to determining whether the forcing term is greater than the predetermined threshold, determining that the SPI event will occur.

2. The method of claim 1, wherein the predetermined threshold for the forcing term is an absolute value.

3. The method of claim 1, wherein the predetermined threshold for the forcing term is a rate of change.

4. The method of claim 1, wherein the predetermined threshold for the forcing term is a variance.

5. The method of claim 1, wherein the corrective action is adding fuel to the internal combustion engine.

6. The method of claim 1, further comprising updating HAVOK model using the monitored sensor data.

7. The method of claim 1, wherein the sensor is at least one of a knock sensor, an ion sensor, or a manifold air pressure sensor.

8. A tangible, non-transitory, machine-readable medium, comprising machine-readable instructions, that when executed by a processor, cause the processor to:

monitor sensor data from a sensor that is coupled to an internal combustion engine of a vehicle;

determine whether a stochastic preignition (SPI) event will occur using the sensor data and a Hankel Alternative View of Koopman (HAVOK) model; and commanding the vehicle to take a corrective action before the SPI event occurs to prevent the SPI event from happening in response to determining that the SPI event will occur;

wherein the sensor data includes a peak cylinder pressure in the internal combustion engine of the vehicle;

wherein the tangible, non-transitory, machine-readable medium, further comprises machine-readable instructions, that when executed by the processor, causes the processor to:

determine whether the SPI event will occur using the sensor data and the HAVOK model includes determining, in real time, a forcing term using the sensor data, wherein the forcing term is based on the peak cylinder pressure in the internal combustion engine of the vehicle;

wherein the tangible, non-transitory, machine-readable medium, further comprising machine-readable instructions, that when executed by the processor, causes the processor to:

determining whether the forcing term is greater than a predetermined threshold; and in response to determining whether the forcing term is greater than the predetermined threshold, determining that the SPI event will occur.

9. The tangible, non-transitory, machine-readable medium of claim 8, wherein the predetermined threshold for the forcing term is an absolute value.

10. The tangible, non-transitory, machine-readable medium of claim 8, wherein the predetermined threshold for the forcing term is a rate of change.

11. The tangible, non-transitory, machine-readable medium of claim 8, wherein the predetermined threshold for the forcing term is a variance.

12. A system, comprising:

an internal combustion engine;

a sensor coupled to the internal combustion engine;

a controller in communication with the sensor, wherein the controller is programmed to:

monitor sensor data from the sensor that is coupled to the internal combustion engine of a vehicle;

determine whether a stochastic preignition (SPI) event will occur using the sensor data and a Hankel Alternative View of Koopman (HAVOK) model; and commanding the vehicle to take a corrective action before the SPI event occurs to prevent the SPI event from happening in response to determining that the SPI event will occur;

wherein the sensor data includes a peak cylinder pressure in the internal combustion engine of the vehicle;

wherein the controller is programmed to determine whether a SPI event will occur using the sensor data and the HAVOK model includes determining, in real time, a forcing term using the sensor data, wherein the forcing term is based on the peak cylinder pressure in the internal combustion engine of the vehicle;

wherein the controller is programmed to:

determining whether the forcing term is greater than a predetermined threshold; and in response to determining whether the forcing term is greater than the predetermined threshold, determining that the SPI event will occur.

* * * * *